United States Patent [19] [11] Patent Number: 4,961,790
Smith et al. [45] Date of Patent: Oct. 9, 1990

[54] CONCRETE ADMIXTURE DEVICE AND METHOD OF USING SAME

[75] Inventors: Dwight Smith, Duncan, Okla.; Jack L. Edwards, Dallas, Tex.

[73] Assignee: Fritz Chemical Company, Dallas, Tex.

[21] Appl. No.: 354,299

[22] Filed: May 19, 1989

[51] Int. Cl.$^5$ .................. C04B 22/00; C04B 24/00
[52] U.S. Cl. .................. 106/823; 106/819; 106/809; 106/725; 106/726; 524/4
[58] Field of Search .................. 206/219, 828; 106/96, 106/85

[56] References Cited

U.S. PATENT DOCUMENTS

| | | | |
|---|---|---|---|
| 2,700,461 | 7/1952 | Smith | 206/219 |
| 3,294,224 | 12/1966 | Horwitz | 206/219 |
| 3,860,219 | 1/1975 | Nickerson, Jr. | 206/219 |
| 4,772,326 | 10/1988 | Heinen et al. | 106/85 |

Primary Examiner—William R. Dixon, Jr.
Assistant Examiner—Melissa Bonner
Attorney, Agent, or Firm—Johnson & Gibbs

[57] ABSTRACT

A device comprising a solid or powdered concrete admixture contained in a water-soluble container such that when the container and its contents are introduced into a wet mixer and agitated for a period of time, the water-soluble container is dissolved and the contents are released into the wet mixer. A separate water-insoluble receptacle is used to house and store the water-soluble container and its contents. In addition, there is disclosed a method for modifying the properties of a concrete by introducing a pre-weighed amount of solid admixture contained in a water-soluble container into a wet mixer and thereafter agitating the resulting mix.

3 Claims, No Drawings

CONCRETE ADMIXTURE DEVICE AND METHOD OF USING SAME

FIELD OF THE INVENTION

This invention relates to a device composed of a solid or powdered admixture contained in a water-soluble container. In particular, the present invention relates to a device having a concrete admixture contained within a container formed of a water-soluble material such that when the container and its contents are introduced into a wet concrete mixer and agitated for a period of time, the water-soluble container is dissolved and the contents thereof are released into the wet mixer The present invention also relates to a method for modifying the properties of a concrete by introducing a pre-weighed amount of powdered solid concrete admixture within a water-soluble container into a wet mixer and thereafter agitating the resulting mix.

BACKGROUND OF THE INVENTION

As known in the art, an admixture is a material other than hydraulic cement, water, fiber reinforcement and aggregates that is used as ar ingredient of concrete or mortar and is added to the batch immediately before or during its mixing. Admixtures are used to modify the properties of the concrete in such a way as to make it more suitable for a particular purpose or for economy. Thus, the major reasons for using admixtures are (1) to achieve certain properties in concrete more effectively than by other means; (2) to maintain the quality of concrete through the successive stages of mixing, transporting, placing, and curing during adverse weather or traffic conditions; (3) to overcome certain emergencies during concreting operations; and (4) to reduce the cost of concrete construction. In some instances, the desired result can only be achieved by the use of an admixture. In addition, using an admixture allows the employment of less expensive construction methods or designs and thereby offsets the costs of the admixture.

For example, at the end of a delivery, concrete mixers may contain from 200 to 600 pounds of residual cement, sand or rock When left in the mixer overnight, the residual concrete will settle and harden in the bottom of the mixer. While the residual materials can be washed out of the mixer with a large amount of water, disposal of the liquid may cause an environmental problem particularly in large metropolitan areas. To avoid this problem, it is desirable to delay or retard the setting of residual concrete in a mixer so that it remains fluid and the residual material can still be used the next day. It is also desirable to be able to delay or retard the setting of concrete in a mobile mixer while the mixer is being transported to another location. For specific applications, it may also be desirable to retard or delay the setting of concrete for a specific length of time during breakdown or delay in traffic in populated areas. The addition of retarding admixture to the concrete is used to solve each of these problems. By varying the amounts of a retarding admixture used in a batch, the setting of the concrete can be delayed for a selected time period. The availability of a pre-weighed or pre-measured quantity of retarding admixture can increase the accuracy with which the setting time can be delayed.

Admixtures are commercially available as water-soluble solids or powders, requiring job mixing at the point of usage, or as ready-to-use liquids added at bulk blending station. The successful use of admixtures depends upon the accuracy with which they are prepared and batched. Batching means the weighing or volumetric measuring of the ingredients for a batch of either concrete or mortar and introducing them into the mixer The amount of admixture added during batching must be carefully controlled. Inaccuracies in the amount of admixture added can significantly affect the properties and performance of the concrete being batched and even defeat the original purpose of including the admixture. The need for accuracy in measuring the amount of solid admixture to be added to a batch is particularly acute where only a relatively small amount of admixture is acquired for the job.

For powdered solid admixtures, it is particularly cumbersome to weigh the required amount of solid admixtures at the job because an additional scale or weighing apparatus must always be kept handy. At the job site, it is highly desirable to be able to add a known amount of solid admixture, preferably pre-measured in a bag, to the wet mixer and eliminating the requirement of weighing the admixture during batching. The use of pre-measured bags of concrete admixture not only minimizes human error in handling and pre-weighing the solid admixtures, it also facilitates the process of mixing. The biggest drawback of conventionally pre-measured and bagged admixtures is that opening and emptying the bags into the mixer creates a mess and results in wasting a certain amount of the admixture material which contributes to inaccuracies in batching.

SUMMARY OF THE INVENTION

The present invention relates to a new device having a water-soluble container and a solid or powdered admixture contained in the water-soluble container In particular, the present invention relates to a device comprising a solid or powdered concrete admixture within a container formed of water-soluble material such that when the container and its contents are introduced into a wet mixer and agitated for a period of time, the water-soluble container is dissolved and the admixture is released into the wet mixer A separate water-insoluble container can be used to store and protect the water-soluble container and its admixture contents until they are ready for use.

The present invention further provides a method for modifying the properties of concrete by introducing a solid or powdered admixture, contained within a water-soluble container, into a wet mixer containing the concrete and thereafter agitating the mix for a sufficient amount of time to dissolve the water-soluble container and effect addition of the admixture to the concrete.

Accordingly, an object of the present invention is to provide a pre-measured amount of solid or powdered admixture in a water-soluble container so that the container, together with its contents, can be readily introduced into, and totally dissolved in, a concrete wet mixer Still a further object of the present invention is to provide a pre-weighed amount of admixture in a container formed of water-soluble material that readily disperses in a concrete mixture with as little as about 5 to 10 minutes agitation Another object of the present invention is to provide a pre-weighed amount of solid or powdered admixture in a water-soluble container which in turn is kept in a water-insoluble receptacle to protect it during transportation and stored until it is ready for use.

Yet another object of the present invention is to provide an expedient and reliable method for modifying the properties of a cement by introducing a known amount of a selected form of lignosulfonate into the wet mix so that the rate of setting of the cement mix can delayed, and no new admixture is needed to re-accelerate the rate of the setting.

Still another object of the present invention is to provide an economic, expedient, and reliable way for modifying the properties of a concrete by introducing a pre-measured amount of solid or powdered admixture into the wet mixer.

DETAILED DESCRIPTION OF THE INVENTION

The present invention relates to a new device having a water-soluble container and a solid or powdered admixture contained in the water-soluble container In particular, the present invention relates to a device having a concrete admixture contained within a container formed of water-soluble material such that when the container and its contents are introduced into a wet concrete mixer and agitated for a period of time, the water-soluble container is dissolved and the contents thereof are released into the wet mixer In contrast to the common practice of adding admixture in a liquid form to a concrete mixture at the bulk blending station, the present invention pertains to adding solid or powdered admixture to a concrete mixture in a water-soluble container The admixture can be added at the bulk plant or at the job site at any particular time depending on the admixture used. A wet mixer, as used herein, denotes a machine used in the blending of constituents of concrete, grout, mortar, cement paste, or other similar mixture in the presence of water The ingredients in the wet mixer mix with the added admixture to modify the properties of the resultant concrete. A separate water-insoluble insoluble receptacle can be used to house and protect the water-soluble container of admixture so that the new device can be transported and stored without the danger of the water-soluble container dissolving or deteriorating during the transportation or storage. The present invention also relates to a method for modifying the properties of a concrete by introducing a solid or powdered admixture, contained within a water-soluble container, into a wet mixer containing the concrete and thereafter agitating the mix for a sufficient amount of time to dissolve the water-soluble container and effect the suspension or dissolution of the admixture in the other ingredients of the concrete present in the wet mixer The method of the present invention allows a powdered solid admixture to be added or dispensed into a wet mixer expediently, economically and accurately.

Some admixtures are used to modify the fluid properties of fresh concrete, mortar and grout, while others are used to modify hardened concrete, mortar, and grout. The various admixtures used in the present invention are materials that can be used in concrete mortar or grout for the following purposes: (1) to increase workability without increasing water content or to decrease the water contents at the same workability; (2) to retard or accelerate the time of initial setting; (3) to reduce or prevent settlement of the finished material or to create slight expansion thereof; (4) to modify the rate and/or capacity for bleeding; (5) to reduce segregation of constituent ingredients; (6) to improve penetration and pumpability; (7) to reduce the rate of slump loss; (8) to retard or reduce heat evolution during early hardening; (9) to accelerate the rate of strength development at early stages; (10) to increase the strength of the finished material (compressive, tensile, or flexural); (11) to increase durability or resistance to severe conditions of atmospheric exposure, including application of deicing salts; (12) to decrease the capillary flow of water within the material; (13) to decrease permeability of the material to liquids; (14) to control expansion caused by the reaction of alkalies with certain aggregate constituents; (15) to produce cellular concrete; (16) to increase the bond of concrete to steel reinforcement elements; (17) to increase the bond between old and new concrete; (18) to improve the impact resistance and abrasion resistance of finished materials; (19) to inhibit the corrosion of embedded metal; (20) to produce colored concrete or mortar; and (21) to introduce natural or synthetic fibers to reinforce concrete.

Concrete admixtures are classified by function as follows:

Accelerators are used to accelerate the setting and earlystrength development of concrete. Some of the common materials that can be used to achieve this function are calcium chloride, triethanolamine, sodium thiocyanate, calcium formate, calcium nitrite, and calcium nitrate.

Retarding, or delayed-setting, admixtures are used to retard, delay, or slow the rate of setting of concrete. Retarders are used to offset the accelerating effect of hot weather on the setting of concrete, or delay the initial set of concrete or grout when difficult conditions of placement occur, or problems of delivery to the job site, or to allow time for special finishing processes. Most retarders also act as water reducers and can also be used to entrain some air into concrete. Lignosulfonates, hydroxylated carboxylic acids, lignin, borax, gluconic, tartaric and other organic acids and their corresponding salts, and certain carbohydrates can be used as retarding admixtures.

Air detrainers are used to decrease the air content in the mixture of concrete. Tributyl phosphate, dibutyl phthalate, octyl alcohol, water-insoluble esters of carbonic and boric acid, and silicones are some of the common materials that can be used to achieve this effect.

Air-entraining admixtures are used to purposely entrain microscopic air bubbles into concrete. Air-entrainment dramatically improves the durability of concrete exposed to moisture during cycles of freezing and thawing. In addition, entrained air greatly improves a concrete's resistance to surface scaling caused by chemical deicers. Air entrainment also increases the workability of fresh concrete while eliminating or reducing segregation and bleeding. Materials used to achieve these desired effects can be selected from salts of wood resin; (Vinsol resin); some synthetic detergents; salts of sulfonated lignin; salts of petroleum acids; salts of proteinaceous material; fatty and resinous acids and their salts; alkylbenzene sulfonates; and salts of sulfonated hydrocarbons.

Alkali-reactivity reducers can reduce alkali-aggregate expansion of these reducers, pozzolans (fly ash, silica fume), blast-furnace slag, salts of lithium and barium, and other air-entraining agents are especially effective.

Bonding admixtures are usually added to portland cement mixtures to increase the bond strength between old and new concrete and include organic materials such as rubber, polyvinyl chloride, polyvinyl acetate, acrylics, styrene butadiene copolymers, and other powdered polymers.

Water-reducing admixtures are used to reduce the amount of mixing water required to produce concrete of a certain slump, to reduce the ratio of water and cement, or to increase slump. Typically, water reducers will reduce the water content of the concrete mixture by approximately 5% to 10%.

Superplasticizers are high-range water reducers, or water-reducing admixtures. They are added to concrete to make high-slump flowing concrete, thus reduce the water-cement ratio. These admixtures produce large water reduction or great flowability without causing undue set retardation or entrainment of air in mortar or concrete. Among the materials that can be used as superplasticizers are sulfonated melamine formaldehyde condensates, sulfonated naphthalene formaldehyde condensates, certain organic acids, lignosulfonates, and/or blends thereof.

Natural and synthetic admixtures are used to color concrete for aesthetic and safety reasons. These coloring admixtures are usually composed of pigments and include carbon black, iron oxide, phthalocyanine, umber, chromium oxide, titanium oxide, and cobalt blue.

Corrosion inhibitors in concrete serve to protect embedded reinforcing steel from corrosion due to its highly alkaline nature. The high alkaline nature of the concrete causes a passive and noncorroding protective oxide film to form on the steel. However, carbonation or the presence of chloride ions from deicers or seawater can destroy or penetrate the film and result in corrosion. Corrosion-inhibiting admixtures chemically arrest this corrosion reaction. The materials most commonly used to inhibit corrosion are calcium nitrite, sodium nitrite, sodium benzoate, certain phosphate or fluosilicates, and fluoaluminates.

Dampproofing admixtures reduce the permeability of concrete that have low cement contents, high water-cement ratios, or a deficiency of fines in the aggregate. These admixtures retard moisture penetration into dry concrete and include certain soaps, stearates, and petroleum products.

Grouting agents, such as air-entraining admixtures, accelerators, retarders, and non-shrink and workability agents, adjust grout properties to achieve a desired result for specific applications. For example, portland cement grouts are used for a variety of different purposes, each of which may require a different agent: to stabilize foundations, set machine bases, fill cracks and joints in concrete work, cement oil wells, fill cores of masonry walls, grout pre-stressing tendons and anchor bolts, and fill the voids in pre-placed aggregate concrete.

Gas formers, or gas-forming agents, are sometimes added to concrete and grout in very small quantities to cause a slight expansion prior to hardening. The amount of expansion is dependent upon the amount of gas-forming material used, the temperature of the fresh mixture. Aluminum powder, resin soap and vegetable or animal glue, saponin or hydrolyzed protein can be used as gas formers.

Permeability reducers are used to reduce the rate at which water under pressure is transmitted through concrete. Silica fume, fly ash, ground slag, natural pozzolans water reducers, and latex can be employed to decrease the permeability of the concrete. Pozzolan is a siliceous or siliceous and aluminous material, which in itself possesses little or no cementitious value. However, in finely divided form and in the presence of moisture, Pozzolan will chemically react with calcium hydroxide at ordinary temperatures to form compounds possessing cementitious properties.

Pumping aids are added to concrete mixes to improve pumpability. These admixtures thicken the fluid concrete, i.e., increase its viscosity, to reduce de-watering of the paste while it is under pressure from the pump. Among the materials used as pumping aids in concrete are organic and synthetic polymers, hydroxyethylcellulose (HEC) or HEC blended with dispersants, organic flocculents, organic emulsions of paraffin, coal tar, asphalt, acrylics, bentonite and pyrogenic silicas, natural pozzolans, fly ash and hydrated lime.

Bacteria and fungal growth on or in hardened concrete may be partially controlled through the use of fungicidal, germicidal, and insecticidal admixtures. The most effective materials for these purposes are polyhalogenated phenols, dieldrin emulsions, and copper compounds.

Fresh concrete can sometimes be harsh because of faulty mixture proportions or certain aggregate characteristics such as particle shape and improper grader Under these conditions, entrained air which acts like a lubricant, can be used as a workability improving agent. Other workability agents are water reducers and certain finely divided admixtures.

Finely divided mineral admixtures are materials in powder or pulverized form added to concrete before or during the mixing process to improve or change some of the plastic or hardened properties of portland cement concrete. Portland cement, as used in the trade, means a hydraulic cement produced by pulverizing clinker consisting essentially of hydraulic calcium silicates, all usually containing one or more of the forms of calcium sulfate as an interground addition with ASTM types I, II, III, IV, or V. The finely divided mineral admixtures can be classified according to their chemical or physical properties as: cementitious materials; pozzolans; pozzolanic and cementitious materials; and nominally inert materials. Cementitious materials are materials that alone have hydraulic cementing properties, and set and harden in the presence of water Included in cementitious materials are ground granulated blast-furnace slag natural cement, hydraulic hydrated lime, and combinations of these and other materials. As discussed above, pozzolan is a siliceous or aluminosiliceous material that possesses little or no cementitious value but will, in the presence of water and in finely divided form, chemically react with the calcium hydroxide released by the hydration of portland cement to form materials with cementitious properties. Diatomaceous earth, opaline cherts, clays, shales, fly ash, silica fume, volcanic tuffs and pumicites are some of the known pozzolans. Certain ground granulated blast-furnace slags and high calcium fly ashes possess both pozzolanic and cementitious properties. Nominally inert materials can also include finely divided raw quartz, dolomites, limestones, marble, granite, and others. Synthetic or natural fibers can be included to reinforce a set concrete. Among the fibers are nylon, polypropylene, zirconium materials, and various kinds of fiber glasses.

As discussed above, polymer of lignosulfonates are widely used raw materials in the production of water reducing admixtures. They are also used to retard or delay the setting of concrete. The lignosulfonates may have an average molecular weight of approximately 3,000 to 5,000 with the molecular weight distribution ranging from a few hundreds to 100,000. The molecule is a polymer of substituted phenyl propane unit with hydroxyl (OH), methoxy (OCH$_3$), phenyl ring (C$_6$H$_6$), and sulfonic acid (SO$_3$H) groups. Lignosulfonate is obtained as a waste liquor during the production of paper-making pulp from wood whose composition may include from about 20% to about 30% of lignin Lignosulfonate contains a complex mixture of sulfonation products of lignin, decomposition products of cellulose and lignin, various carbohydrates and free sulfurous acid and sulfates. Lignosulfonates are also available commercially as their sodium or calcium salts.

The term water-soluble as used herein denotes a physical or a chemical property of the material. It means that the material will dissolve in water, either cold, warm, or hot immediately or after a certain period of time. It also means water degradable or water permeable. Water-soluble materials that were successfully used for the present invention included poly(vinyl alcohol) (hereinafter "PVA"), polyethylene oxide (hereinafter "Polyox"). Other materials that could be used include both synthetic and natural materials, such as foam, cellulose, paper products, cotton products, and others.

Suitatle PVA bags are bags made of sheets or films of PVA. Such PVA has a range of molecular weight with an average molecular weight of about million Daltons. Suitable PVA sheets or films have a thickness range of from about 0.5 mil to about 10 mils. The preferred range of thickness is from about 1.5 mils to about 2.5 mils. Suitable PVA bags with a thickness of about 1.5 to 2.5 mils dissolved in a concrete mix containing water after about 10 minutes of agitation at ambient temperature without adverse effect on the setting of cement or concrete.

Suitable Polyox bags are bags made of sheets of films of Polyox. It is manufactured by Union Cartide in N J. Polyox has a range of molecular weight from about 100,000 to about 8 million Daltons. Preferably, the molecular range is from about 500,000 to about 1 million Daltons. The thickness of Polyox sheets or films has a range from about 0.5 mils to about 10 mils. Preferably, the thickness of Polyox sheets or films has a range from about 1.5 mils to 5 mils. The most preferred range of thickness is from about 2 mils to about 3 mils. Suitable Polyox bags with a thickness of about 2 to 3 mils dissolved in an concrete mix containing water after about 10 minutes of agitation at ambient temperature without adverse effect on the setting of cement or concrete.

Normally, a pre-weighed or pre-measured amount of solid or powdered admixture is enclosed in a water-soluble container as a package. At the time of use, one or more packages, depending on the amounts of admixture required, are added to the concrete mix in a wet mixer. After agitating or stirring the mixture for a sufficient amount of time, usually a matter of a few minutes, the water-soluble container dissolves. The contents of the water-soluble container, i.e., the solid admixture material, combine with the other ingredients present in the wet mixer. After further agitation or stirring, the solid admixture ingredients either suspend or dissolve in the concrete mixture to modify the properties of the resultant concrete.

For storage and transportation, it may be desirable to have the water-soluble container, and its contents, further packaged, enclosed, or sealed in a water-insoluble receptacle. The external receptacle protects the internal water-soluble container from premature deterioration due to contact with moisture. The external receptacle can be a water-insoluble plastic bag, a specifically treated paper bag or boxes or barrels made of plastic, treated paper, or metal. The water-insoluble receptacle material can be flexible or rigid, abrasion resistant or even oil impermeable and non-oil degradable such as rubber materials, polyurethane or Neoprene. The main consideration for this external receptacle is that it is to be non-water degradable and water impermeable. The water-soluble container, and its contents of solid or powdered admixture, is first removed from the external receptacle and then immediately dispensed into a wet mixer.

A particular effective method to delay the setting of a concrete is to introduce a selected amount of lignosulfonate polymer into a wet mixer. The particular type of lignosulfonate was prepared by treating select chips of soft woods, mostly hemlock, in a mixture of an acidic calcium bisulfite solution containing from about four to ten percent of sulfur dioxide by weight of solution. Alternatively, mixtures of soft woods and a small amount cf hard woods, such as white birch or maple, can be used. Preferably, the solution contained about six percent of sulfur dioxide. Then the mixture was heated to a temperature from about 100° C. to about 170° C. for a time period from about 4 to 10 hours. Preferably the mixture was heated to about 140 ° C. for about 6 hours. The excess of sulfur dioxide was then removed by reducing the volume of the mixture by evaporation to about half of its original volume to give a liquid. The liquor was then neutralized to a PH of about 7 with a base, such as calcium hydroxide or sodium hydroxide to give a neutralized solution. The neutralized solution then went through a yeast or an alcohol fermentation process to reduce the amount of sugar, such as xylose, to about 2–8 percent by weight of solids. Preferably, the amount of xylose was reduced to about 5 percent by weight of solids. Excess water was then removed by further evaporation. Soft woods as used here denote woods from coniferous trees whose leaves are needle-like, such as balsam spruce, hemlock, or scale-like, such as cedar. A conifer is a cone-bearing tree or shrub so called because the fruit of the tree is a cone. Various lignosulfonates were examined for their retarding properties. Only the lignosulfonate polymer prepared according to the method described above gave the desired effect in that the polymer did not over-retard the setting of a concrete.

EXAMPLE 1

For example, adding a package containing 2 pounds of calcium lignksulfonate polymer, prepared according to the method described above, contained in a water-soluble poly(vinyl alcohol), having a thickness of 1.5 mils, bag into 1 cubic yard of concrete, or cement, in cold weather (from about 35° F. to about 70° F.), the setting of the concrete was delayed from about 12 to about 16 hours. Here, the amount of polymeric retarding admixture, the calcium lignosulfonate, added was about 0.2 to about 0.8 percent by weight of the concrete mixture.

EXAMPLE 2

In hot weather, when the temperature was from about 70° F. to about 110° F., 2 packages of retarding admixture, each package contained 2 acids of calcium lignosulfonate polymer in a 1.5 mils thick water-soluble poly(vinyl alcohol) bag, delayed the setting of about 1 cubic yard of concrete by about 12 to about 16 hours. Under these conditions, the amount of calcium lignosulfonate, the polymeric retarding admixture, added was about 0.5 to about 1.5 percent by weight of the concrete.

By varying the dosage or amounts of the calcium lignosulfonate, retarding admixture, the setting of concrete can be delayed or retarded under either cold or warm weather conditions. Packages of the calcium lignosulfonate retarding admixture, readily disperse in the concrete with as little as 5 to 10 minutes of agitation or mixing. By delaying the setting of the concrete, the unused concrete in the wet mixer is saved for reuse without the need of disposing it and thereby eliminating the pollution problem The unset concrete is mixed at a later time with fresh concrete or poured with or without the addition of other admixtures to control the set. This retarding admixture may be added to practically any concrete formulation.

EXAMPLE 3

It was also found that adding a calcium lignosulfonate polymer admixture to a concrete did not compromise the 28-Day compressive strength of the resultant concrete. Compressive strength is the measure of maximum resistance of a concrete or mortar specimen to axial loading, usually expressed as force per unit cross-sectional area; or the specified resistance used in design calculations. The strength was measured using a standard 6×12 inch cylinder in a regular strength testing machine. In one trial, 4.5 sacks of a commercially available concrete, ASTM Type I Portland Cement, each sack weighing about 94 pounds, was tested for its compressive strength with and without the addition of about 0.5% by weight of calcium lignosulfonate. Data from the Table presented below clearly show that the compressive strength increased, rather than decreased, after the treatment of concrete with 0.5% by weight of the calcium lignosulfonate delayed-set admixture.

| Concrete - 4½ sacks ASTM Type I Portland Cement | | |
| --- | --- | --- |
| Concrete | Slump | 28-Day Compressive Strength (lbs. per sq. in.) |
| Sampled after mixing - no additive | 1" | 3850–3770 psi |
| Delayed-Set Admixture 0.5%* | 9" | 4180–4070 psi |
| Delayed-Set Concrete Repoured & Sampled | | 3910–3850 psi |

(Concrete left static in the concrete mixer. After 15 hours at approximately 40° F. or 5° C., the concrete had not set.)
*Percent by weight of cement Thus, it can be seen from the foregoing discussion that the present invention solves most of the problems encountered in the prior art practice.

It is thus believed that the operation and construction of the present invention will be apparent from the foregoing description. While the method and device shown and described have been characterized as being preferred, it will be obvious that various changes and modifications may be made therein without departing from the spirit and scope of the invention as defined in the following claims.

It is claimed:

1. A method for modifying the properties of a concrete comprising:
   introducing a solid admixture, contained in a water-soluble container, into a wet mixer to give a resulting mix, said solid admixture being selected from the group consisting of air-entraining admixtures, air detrainer admixture, accelerating admixture, alkali-reactivity reducer, superplasticizer, pumping aids, water-reducing admixture, corrosion inhibitor, permeability reducer, and fibers; said water-soluble container being selected from the group consisting of polyvinyl alcohol container and polyethylene oxide container; and
   thereafter agitating said resulting mix for a sufficient amount of time to dissolve said water-soluble container and to disperse the mixture in the concrete in a substantially uniform fashion.

2. A method for retarding the setting of a concrete comprising:
   introducing a solid retarding admixture contained in a water-soluble container, into a wet mixer to give a resulting mix, said water-soluble container being selected from the group consisting of polyvinyl alcohol container and polyethylene oxide container; and
   thereafter agitating said resulting mix for a sufficient amount of time to dissolve said water-soluble container and to disperse the mixture in the concrete in a substantially uniform fashion.

3. A method for retarding the setting of a concrete comprising:
   introducing a solid lignosulfonate contained in a water-soluble container, into a wet mixer to give a resulting mix, said water-soluble container being selected from the group consisting of polyvinyl alcohol container and polyethylene oxide container; and
   thereafter agitating said resulting mix for a sufficient amount of time to dissolve said water-soluble container and to disperse the mixture in the concrete in a substantially uniform fashion.

* * * * *

UNITED STATES PATENT AND TRADEMARK OFFICE
CERTIFICATE OF CORRECTION

PATENT NO. : 4,961,790

DATED : October 9, 1990

INVENTOR(S) : Dwight Smith and Jack L. Edwards

It is certified that error appears in the above-identified patent and that said Letters Patent is hereby corrected as shown below:

Column 1, line 41, insert --day's-- after "a", which was omitted from the text;

Column 2, line 36, insert a period, --.-- after "container";

Column 7, line 38, change "Cartide" to --Carbide--;

Column 8, line 53, change "lignksulfonate" to --lignosulfonate--; and

Column 8, line 67, delete "acids" before "of" and substitute --pounds-- therefor.

Signed and Sealed this

Thirty-first Day of March, 1992

Attest:

HARRY F. MANBECK, JR.

*Attesting Officer*     *Commissioner of Patents and Trademarks*